(12) United States Patent
Park

(10) Patent No.: US 9,427,810 B2
(45) Date of Patent: Aug. 30, 2016

(54) TOOL HOLDER

(76) Inventor: Joong Han Park, Gimhae (KR)

( * ) Notice: Subject to any disclaimer, the term of this patent is extended or adjusted under 35 U.S.C. 154(b) by 1108 days.

(21) Appl. No.: 13/455,752

(22) Filed: Apr. 25, 2012

(65) Prior Publication Data

US 2013/0288867 A1 Oct. 31, 2013

(51) Int. Cl.
*B23B 29/20* (2006.01)
*B23Q 3/12* (2006.01)

(52) U.S. Cl.
CPC .............. *B23B 29/205* (2013.01); *B23Q 3/12* (2013.01); *Y10T 29/5155* (2015.01); *Y10T 408/957* (2015.01); *Y10T 409/309408* (2015.01)

(58) Field of Classification Search
CPC .......... B23Q 3/12; B23Q 5/04; B23B 29/20; B23B 29/205; B23B 29/24; B23B 29/246; B23B 29/32; Y10T 29/5154; Y10T 29/5155; Y10T 82/2506; Y10T 82/2508; Y10T 408/94; Y10T 408/957; Y10T 409/309352; Y10T 409/309408
USPC ....... 409/231, 232; 408/238, 239 A; 82/120, 82/121; 29/39, 40
See application file for complete search history.

(56) References Cited

U.S. PATENT DOCUMENTS

| | | | | |
|---|---|---|---|---|
| 4,550,922 A * | 11/1985 | Hall | ........................ | B23B 31/14 279/110 |
| 4,834,597 A * | 5/1989 | Andersson | ............ | B23B 31/006 279/103 |
| 6,270,086 B1 * | 8/2001 | Lloyd | ................. | B23B 31/1077 279/46.3 |
| 6,457,920 B1 * | 10/2002 | Kleiner | ................. | B23B 29/046 279/155 |
| 7,520,704 B2 * | 4/2009 | Bae | ..................... | B23B 31/1075 279/83 |
| 2004/0124592 A1 * | 7/2004 | Neumeier | ............... | B23B 31/00 279/51 |
| 2010/0107813 A1 * | 5/2010 | Tatsuda | ................. | B23Q 1/287 74/813 L |

* cited by examiner

*Primary Examiner* — Sunil K Singh
*Assistant Examiner* — Michael Vitale
(74) *Attorney, Agent, or Firm* — John K. Park; Park Law Firm

(57) ABSTRACT

Disclosed therein is an adapter-exchangeable type tool holder, which includes an adapter having fastening holes formed therein and a spindle having blocks and bolts detachably mounted to the fastening holes, wherein the blocks are respectively rotatable on hinge pins joined to the spindle, so that the spindle can be easily joined to and separated from the adapter.

11 Claims, 21 Drawing Sheets

-- Prior Art --

-- Prior Art --

-- Prior Art --

TOOL HOLDER

BACKGROUND OF THE INVENTION

1. Field of the Invention

The present invention relates to a tool holder, and more particularly, to an adapter-exchangeable type tool holder, which includes an adapter having fastening holes formed therein and a spindle having blocks and bolts detachably mounted to the fastening holes, wherein the blocks are respectively rotatable on hinge pins joined to the spindle, so that the spindle can be easily joined to and separated from the adapter.

2. Background Art

In general, there are various types of tool holders, which are used in a tool turret and has a rotary tool mounted detachably. European Patent Laid-open No. EP 1 358 960 A1 discloses a tool holder, which is mainly used in a tool turret. Referring to FIGS. 19 and 20, the tool holder disclosed in European Patent Laid-open No. EP 1 358 960 A1 (hereinafter, called "960 Patent") includes a collet chuck receiver 4 that is formed on a spindle 2 and a tension-adjustable nut 10 that is fastened to a collet chuck 6, to which a tool 7 is joined, and is joined with the spindle by an external screw 11.

In order to exchange a tool with a new one, after the tension-adjustable nut 10 is released to some extent to widen a gap of a cut portion of the collet chuck, the tool is removed from the tool holder, and then, a new tool is joined to the tool holder (former case). Alternatively, after the collet chuck 6 and the tension-adjustable nut 10 are all removed from the tool holder, a clamp 23 to which a new tool is joined is fit to the spindle and a screw 30 is fastened to a screw hole 20, so that the collet chuck or the clamp is fixed to the spindle (latter case).

First, the former case is carried out to exchange only the tool which can be joined to the collet chuck, but has a problem in that it takes much time to set tools and working efficiency is remarkably decreased because all tools must be controlled in central point and projecting length whenever the tools are exchanged. Moreover, in the case of the latter case for exchanging the whole adapter, all of the screws (in the drawings, four screw holes 20 are illustrated) are released and tightened up again to fix a new clamp (adapter). However, the latter case also has a problem in that it takes much time to exchange the tool due to a series of the process to release and tighten up the screws one by one.

Furthermore, the latter case has another problem in that the state where the adapter is rejoined after being separated from the tool holder is less in degree of precision than the original state because there is no guarantee that the adapter can be joined to the tool holder as it was when the adapter is rejoined after being separated from the tool holder.

In order to solve the above problems, the 960 Patent discloses a tool holder as illustrated in FIG. 21. That is, the tool holder disclosed in the 960 Patent includes a collet chuck receiver 4 formed in a spindle, a clamp 23 formed on the collet chuck receiver 4, and a screw 30 for fastening the clamp 23 to the spindle.

Such a tool holder may be applied to all kinds of adapters, which use or do not use collet chucks, but does not solve the problems of the conventional tool holders illustrated in FIGS. 19 and 20.

First, the tool holder disclosed in the 960 Patent has a problem in that it cannot keep the assembled state before the clamp is separated from the tool holder when the clamp separated from the tool holder is rejoined to the tool holder using the screw 30. Second, the tool holder has another problem in that it takes much time to release and tighten up all of the screws because the adapter can be exchanged only when four screws are all released and tightened up again. Third, the tool holder has a further problem in that the screws may be lost because the screws are not fixed to the clamp.

SUMMARY OF THE INVENTION

Accordingly, the present invention has been made to solve the above-mentioned problems occurring in the prior arts, and it is an object of the present invention to provide a tool holder, which can hold various tools and includes an adapter having fastening holes and a spindle having blocks and bolts detachably mounted to the fastening holes, wherein the blocks are respectively rotatable on hinge pins joined to the spindle, so that the spindle can be easily joined to and separated from the adapter.

It is another object of the present invention to provide a tool holder that the adapter has a key formed at one side thereof and the spindle has a key coupling groove corresponding to the shape of the key, so that the adapter can be always joined at the original position when it is rejoined to the spindle after being separated, and hence, there is no need to adjust the degree of joining.

It is a further object of the present invention to provide a tool holder, which can keep the same degree when the tool holder is attached and detached because one side of the key and one side of the key groove can be in perfect contact with each other even under the condition that there is no external force when a key of eccentricity controlling means is joined to a key groove of a disk.

It is a still further object of the present invention to provide a tool holder that the block of the eccentricity controlling means has an elongated hole to which a head portion of an eccentricity control pin is fit, so that just the tool holder requiring adjustment relative to a rotation of the eccentricity control pin is laterally movable to thereby prevent a vertical movement of the block or the tool holder.

It is another object of the present invention to provide a tool holder that the spindle includes a first tool spindle and a second tool spindle and the degree of freedom of the second tool spindle can be enhance when the first tool spindle and the second tool spindle are joined together by a pin.

It is a further object of the present invention to provide a tool holder, in which a support ring is formed on the outside of the joined portion where the first tool spindle and the second tool spindle are joined together so as to keep straightness of the second tool spindle to the first tool spindle when there is no external force.

It is a still further object of the present invention to provide a tool holder, in which the first tool spindle has a depression portion at one side thereof in a perpendicular direction to the direction of the key formed on the second tool spindle and the second tool spindle has a protrusion inserted into the depression portion so as to enhance the degree of freedom in the direction that the second tool spindle is at right angles to the direction of the key.

To accomplish the above object, according to the present invention, there is provided a tool holder including: a body; the spindle formed inside the body, the spindle having blocks, which are respectively rotatable on hinge pins, and bolts, which are respectively fastened to bolt holes of the blocks; and an adapter inserted into the spindle, the adapter having at least one joining hole formed in one side thereof, wherein the adapter is closely fixed to the spindle when the bolts are gradually fastened to the blocks.

As described above, according to the present invention, the tool holder can hold various tools, and includes an adapter having fastening holes and a spindle having blocks and bolts detachably mounted to the fastening holes, wherein the blocks are respectively rotatable on hinge pins joined to the spindle, so that the spindle can be easily joined to and separated from the adapter.

Because the adapter has a key formed at one side thereof and the spindle has a key coupling groove corresponding to the shape of the key in such a fashion that the joining hole of the adapter can be exactly located at the block and bolt when the adapter is fit and joined to the spindle, even though the adapter is rejoined after being separated from the spindle, the adapter can be always joined at the original position, and hence, there is no need to adjust the degree of joining.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention relates to a tool holder, and more particularly, to an adapter-exchangeable type tool holder, which includes an adapter having fastening holes formed therein and a spindle having blocks and bolts detachably mounted to the fastening holes, wherein the blocks are respectively rotatable on hinge pins joined to the spindle, so that the spindle can be easily joined to and separated from the adapter.

Hereinafter, reference will be now made in detail to the preferred embodiments of the present invention with reference to the attached drawings.

Figure 1:
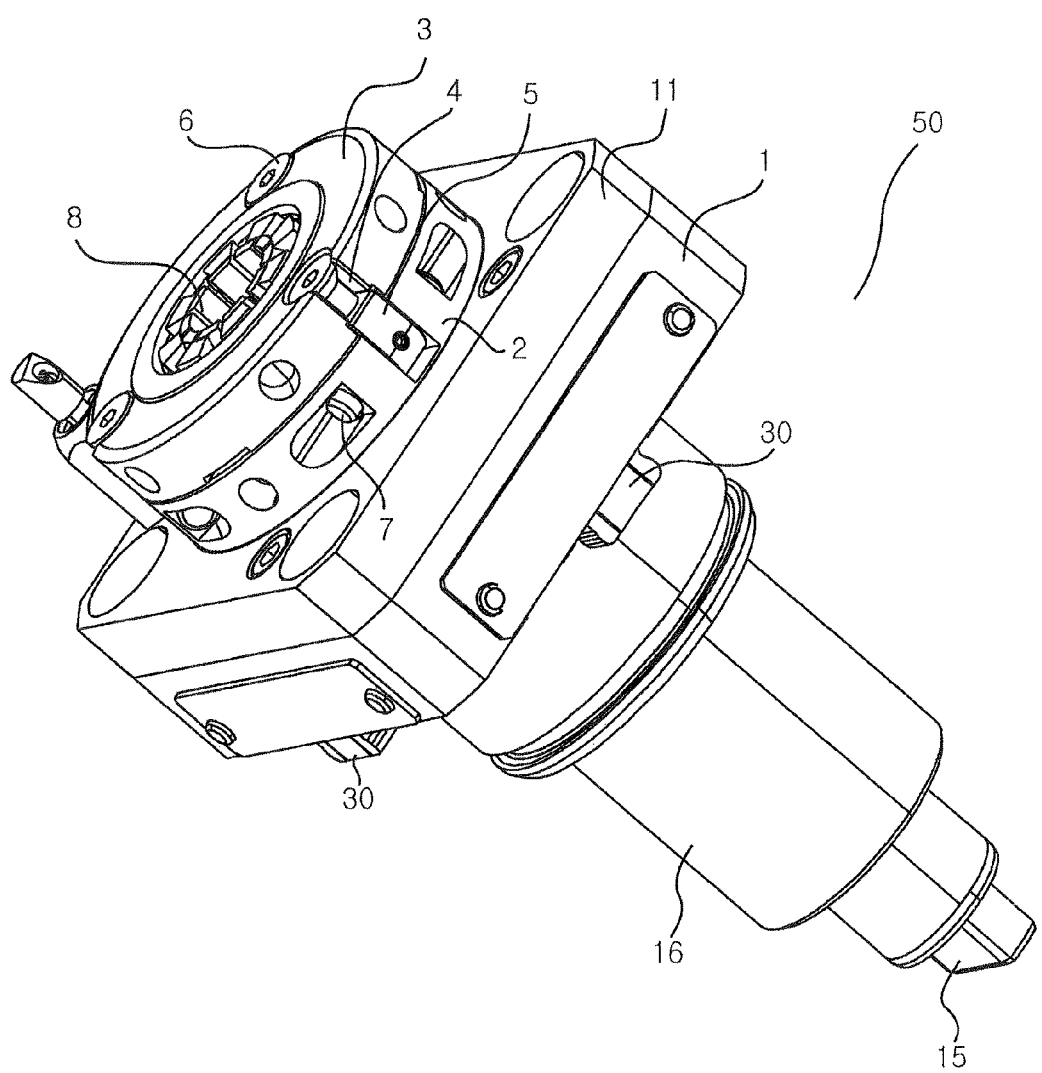
FIG. 1 is a perspective view showing a structure of a tool holder according to the present invention.
Figure 2:
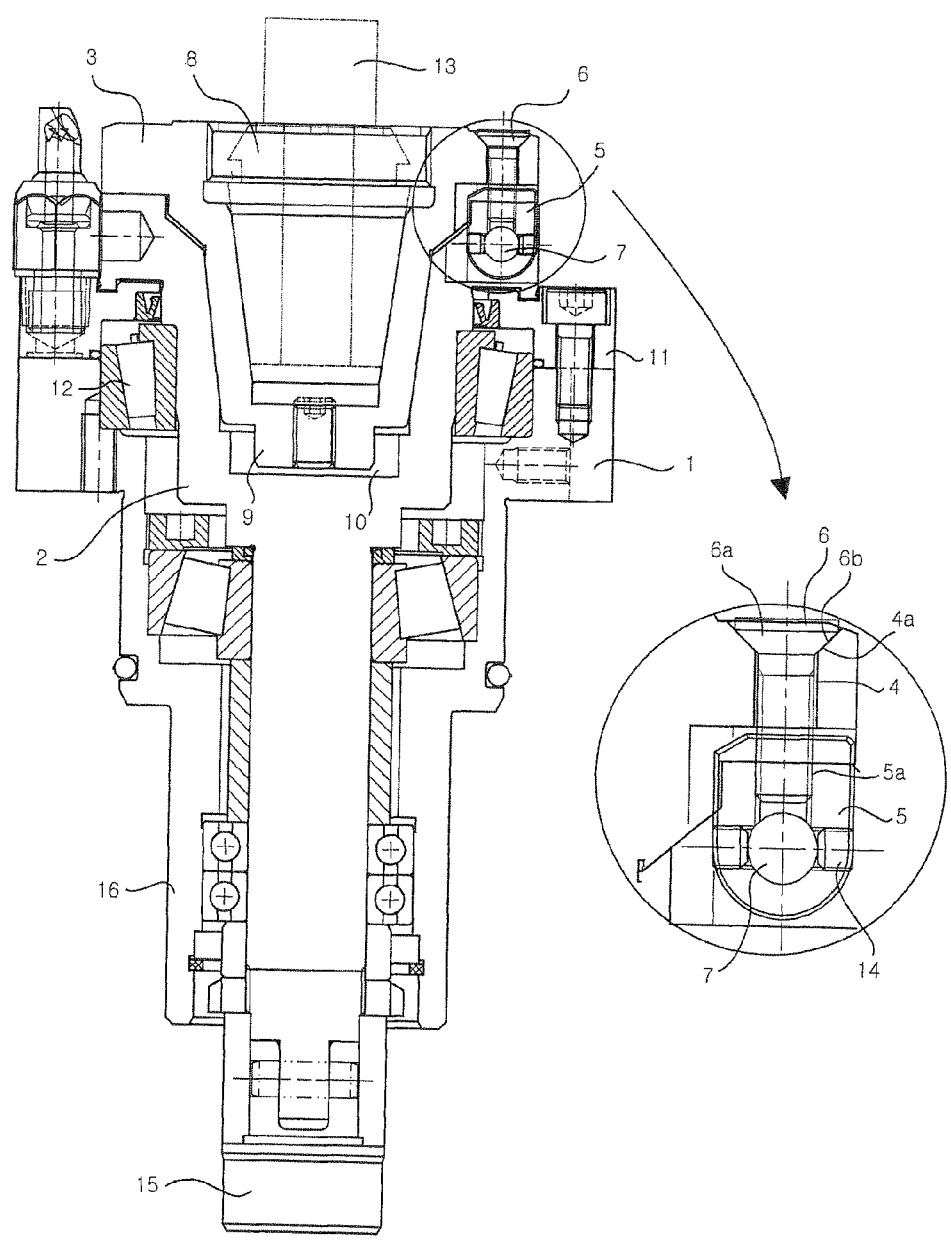
FIG. 2 is a view of the structure of the tool holder.
Figure 3:
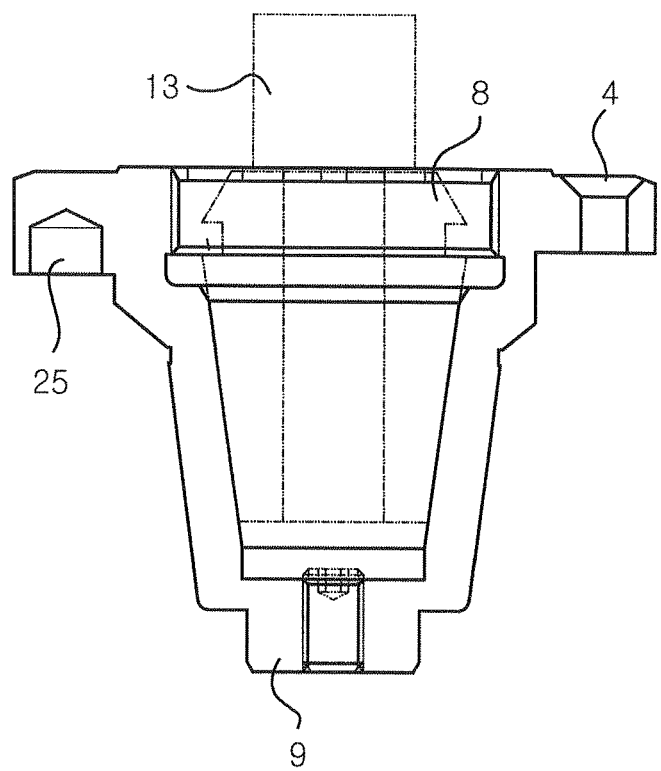
FIG. 3 is a view showing a shape of an adapter according to the present invention.
Figure 4:
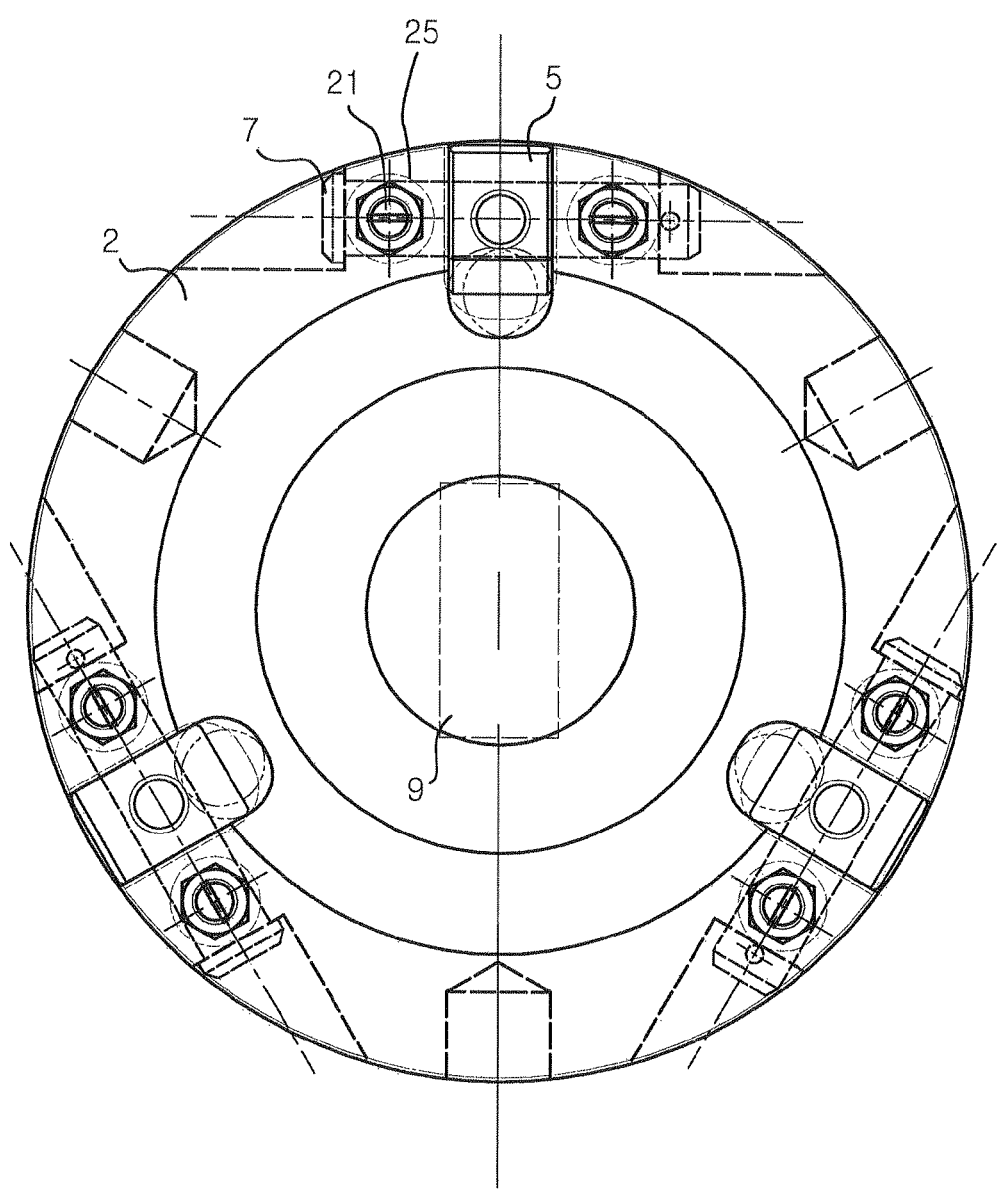
FIG. 4 is a view showing a state where blocks are joined to a spindle of the tool holder according to the present invention.
Figure 5:
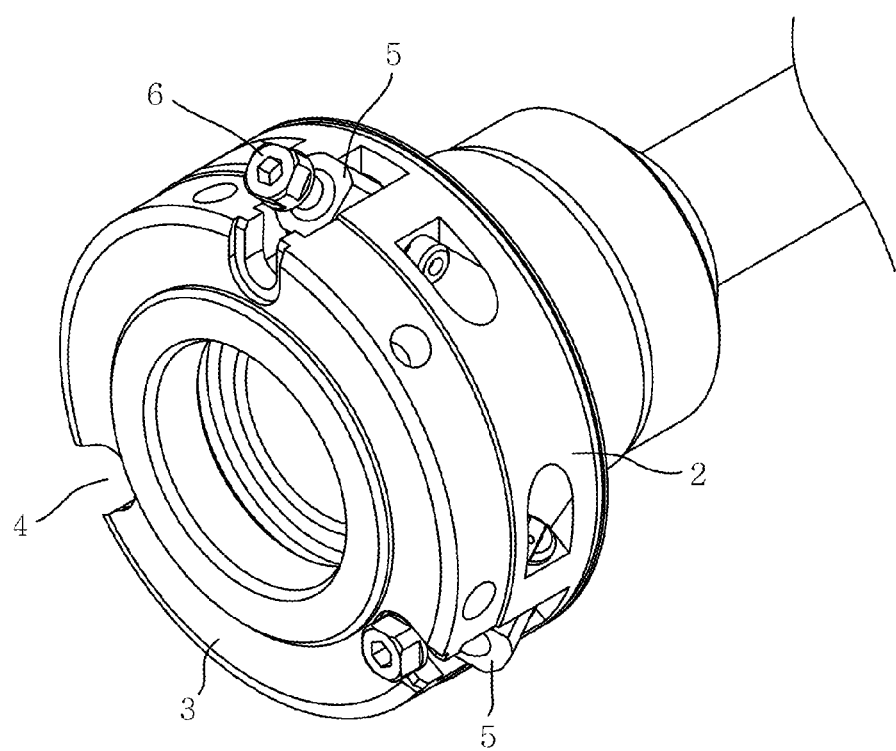
FIGS. 5 and 6 are views showing an operational state of the present invention.
Figure 6:
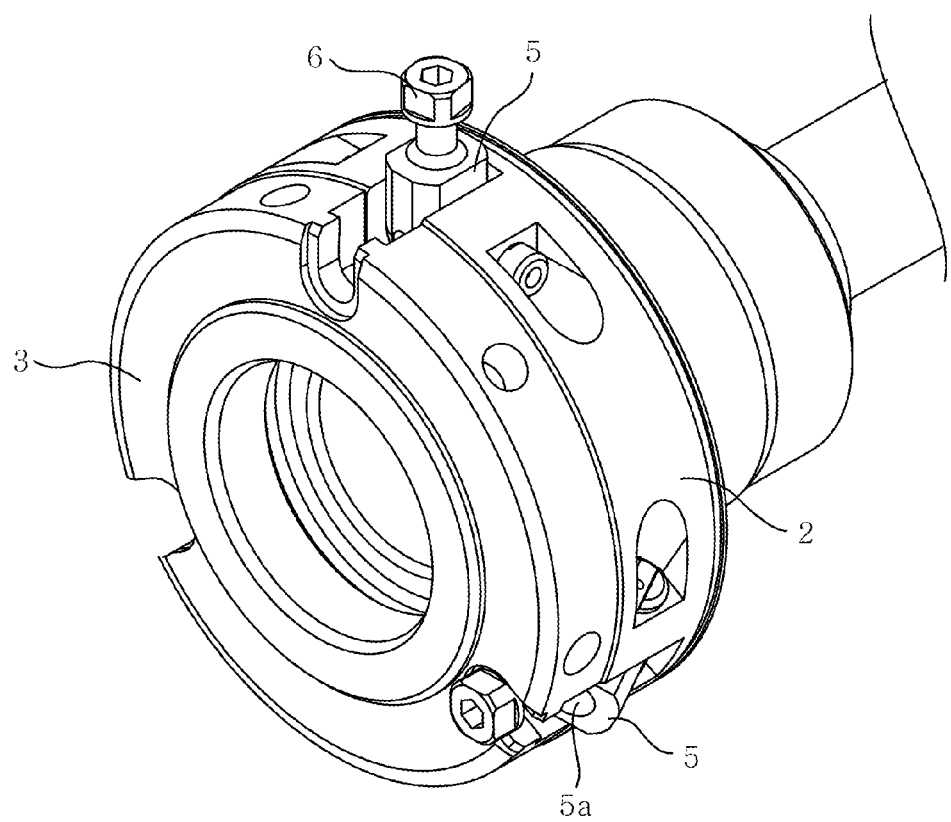
Figure 7:
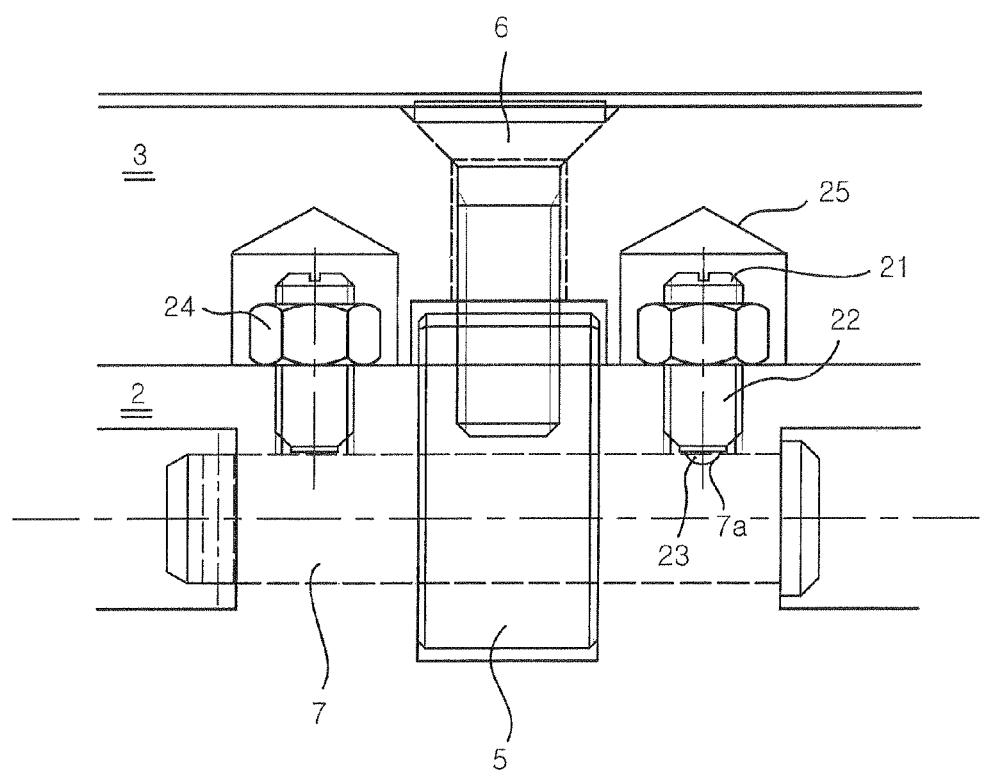
FIG. 7 is a partial view of the tool holder according to the present invention.

FIG. 1 is a perspective view showing a structure of a tool holder according to the present invention, FIG. 2 is a view of the structure of the tool holder, FIG. 3 is a view showing a shape of an adapter according to the present invention, FIG. 4 is a view showing a state where blocks are joined to a spindle of the tool holder, FIGS. 5 and 6 are views showing an operational state of the present invention, and FIG. 7 is a partial view of the tool holder. In the drawings, the tool holder, which transfers a rotational force receiving from a spindle 2 to a rotary tool 13, includes: a body 1; the spindle 2 formed inside the body 1; and an adapter 3 inserted into the spindle 2. The adapter 3 includes at least one joining hole 4 formed in one side thereof and the spindle 2 includes blocks 5 being respectively rotatable on hinge pins 7 and bolts 6 respectively fastened to bolt holes 5a of the blocks 5, so that the adapter 3 can be closely fixed to the spindle 2 when the bolts 6 are gradually fastened to the blocks 5.

First, the tool holder according to the present invention can be used in all kinds of machine tools where a rotational driving power is transferred to the spindle 2, and particularly, may be used as a tool holder for machine tools requiring precision, namely, for machining centers or automatic lathes, and may be also used for tool turrets, which are mounted on the machine tools.

In other words, when a shank 16 integrally or separately formed on the body 1 is joined to a shank joining hole (not shown) formed in the machine tool, a driving force of a motor formed in the machine tool is transferred to the spindle 2 through driving force transferring means of various forms (in the embodiment, the driving force is transferred through a key 15 joined to the spindle 2), and the transferred driving force is transferred to the rotary tool 13 through the adapter 3 joined to the spindle 2.

The spindle 2 is embedded in the body 1 and a cover 11 is formed on one side of the body 1. In the tool holder according to the present invention, the cover 11 is fixed to the body 1, and hence, the cover 11 and the body 1 may be considered as one body.

The spindle 2 is supported by a bearing 12 formed on the outer circumferential surface of one side of the spindle 2, and particularly, the bearing 12 in this embodiment is a tapered roller bearing, and the adapter 3 is inserted into the spindle 2.

In this instance, the adapter 3 may be an adapter 3 having a collet chuck 8 as illustrated in the drawings, or may be an adapter 3, which does not have the collet chuck 8, namely, a side-lock type adapter, a milling arbor type adapter, or others.

The adapter 3 has at least one joining hole 4 formed on one side thereof, and in this embodiment, the adapter 3 has three joining holes 4 spaced apart from each other at equal intervals along the circumferential surface of the adapter 3. The block 5 which is rotatable on the hinge pin 7 is formed on the spindle 2, and the block 5 has the bolt hole 5a so that the bolt 6 is fastened to the bolt hole 5a.

The tool holder having the above structure can join the adapter 3 to the spindle 2 and separate the adapter 3 from the spindle 2 by the rotation of the block 5.

FIG. 1 illustrates a state where the adapter 3 is joined to the spindle 2. In FIG. 1, the block 5 is rotated toward the adapter 3, so that an upper end face of a head portion 6a of the bolt 6 and an upper end face of the spindle 2 are in parallel, and in the above state, when the bolt 6 is tightened up, power is applied in a direction to make the adapter 3 and the spindle 2 get in closer contact with each other, and hence, the adapter 3 is perfectly and closely fixed to the spindle 2.

When the adapter 3 is separated from the spindle 2 to exchange the tool, the bolt 6 is released from the block 5 as much as the head portion 6a of the bolt 6 can be removed from a tapered groove 4a of the joining hole 4, and then, when the bolt 6 and the block 5 are rotated, the adapter 3 can be removed from the spindle 2.

Finally, a tapered surface 6b formed on the head portion 6a of the bolt 6 and the tapered groove 4a of the joining hole 4 get in closer contact with each other when the bolt 6 is joined to the block 5, and hence, the blot 6 is joined while finding a joining center point, so that the joining position of the adapter 3 is naturally adjusted.

It is preferable that the key 9 is formed at one side of the adapter 3. In the case that the key 9 is formed on the adapter 3, the spindle 2 has a key coupling hole 10 having the same shape as the key 9, so that the joining hole 4 of the adapter 3 is joined to the block 5 of the spindle 2 without any interference and it makes the adapter 3 be in the exact joining position.

In other words, in the case of the key 9 illustrated in FIG. 3, a central axis of the key coupling hole 10 coupled with the key 9 and a central axis of the key 9 must be also in parallel, and hence, the adapter 3 can be repeatedly joined while keeping such a condition.

In fact, in the case of general tool holders, when the adapter is first joined, a wanted degree of precision may be obtained through control of the degree of precision, but when the adapter 3 is rejoined after being separated, the adapter shows a joining state different from the initial joining state, and hence, the degree of precision may be sharply reduced. Accordingly, even though the adapter 3 is separated from the spindle to exchange the tool, if the adapter can be rejoined to the spindle while keeping the initial joining state, it can secure the degree of precision. Accordingly, the tool holder according to the present invention can continuously keep the joining state before the adapter 3 is separated from the spindle, namely, the initially set joining state, using the key 9 and the key coupling hole 10 having the same shape as the key 9.

Furthermore, the spindle 2 has the key coupling hole 10, and it is preferable that just one block 5 is positioned on an extension line of the central axis of the key coupling hole 10. The reason is to provide convenience in use by guiding the position that the adapter 3 is joined to the spindle 2.

In the above embodiment, the bolt 6 formed on the extension line of the longitudinally central axis of the key 9 may have a color or a distinguishable mark different from that of the other bolts, so that a user can easily find the joining position of the adapter 3.

In this instance, the block 5 besides the bolt 6 may have such distinguishable color or mark, and if necessary, the spindle 2 may also have such color or mark.

FIG. 7 is a view showing a part of the tool holder according to the present invention. In FIG. 7, the block 5 has a stopper device 20 including: a positioning recess 7a formed at one side of the hinge pin 7 joined with the block 5; and a ball plunger 22 acting according to joining and separation of the adapter 3 and having a ball 23 being seated on the positioning recess 7a. The stopper device 20 may be formed in such a way as to be limited in its movement unless there is an external force by the user when the block 5 reaches a specific position, namely, the joining position of the adapter 3 as shown in FIG. 1 or a position where the adapter 3 will be separated from the spindle as shown in FIG. 6. However, in the case that the tool holder does not have such a stopper device, referring to FIGS. 5 and 6, in the case that one of the blocks 5 faces a joined side of the adapter 3 by self-weight and the rest of the blocks 5 faces the outside of the adapter 3 by self-weight, it may have inconvenience in that the user tightens up one bolt 6 to the upper block 5 and tightens up another bolt 6 to one of lower blocks 5 in a state where the user holds the block 5 and the bolt 6 not to get out of the joining hole 4 after rotating the lower block 5 toward the adapter 3.

Accordingly, even in the above state, the stopper device 20 for keeping the position of the block 5 and the bolt 6 is needed. As shown in FIG. 7, the stopper device 20 includes the positioning recess 7a formed in the hinge pin 7 joined to the block 5 and the ball plunger 22 mounted on the spindle 2.

That is, when the block 5 is joined to the spindle 2, the hinge pin 7 is firmly and forcedly pressed to the block 5 in consideration of directivity of the positioning recess 7a, and the spindle 2 and the hinge pin 7 are loosely joined together, so that the hinge pin 7 can rotate smoothly.

In more detail, the operation of the tool holder will be described. As shown in FIG. 7, in the case that the block 5 is in a direction of the joining state, the ball 23 of the ball plunger 22 is seated on the positioning recess 7a formed at the right of the hinge pin 7, but the ball 23 of the ball plunger 22 is not seated on the positioning recess (not shown) formed at the left of the hinge pin 7 and is located inside the ball plunger 22. On the contrary, in the case that the block is in a direction of the separated state, the ball 23 is located inside the ball plunger 22, which is viewed at the right in the drawing, and the ball 22 of the left side ball plunger 22 is seated on the positioning recess formed in the hinge pin 7 to keep the position.

In other words, the block 5 can keep the joining position and the separation position through an interaction between the ball plunger 22 and the positioning recess 7a of the hinge pin 7 unless any external force is applied to the block 5.

In the above embodiment, right and left positions of the ball plungers 22 and the positioning recesses 7a of the hinge pin 7 may be changed, but in order to obtain the same effect, the pairs of the ball plungers 22 and the positioning recesses 7a for joining and separation must be maintained.

Moreover, the face of the adapter 3 getting in contact with the spindle 2 projects due to the ball plunger 22 joined to the spindle 2, and hence, in order to absorb the projection, the adapter 3 may have a hole 25.

In the description of the present invention, to rotate the block 5 means that the bolt 6 joined to the block 5 is rotated, and in fact, the block 5 is rotated by the bolt 6.

Figure 8:
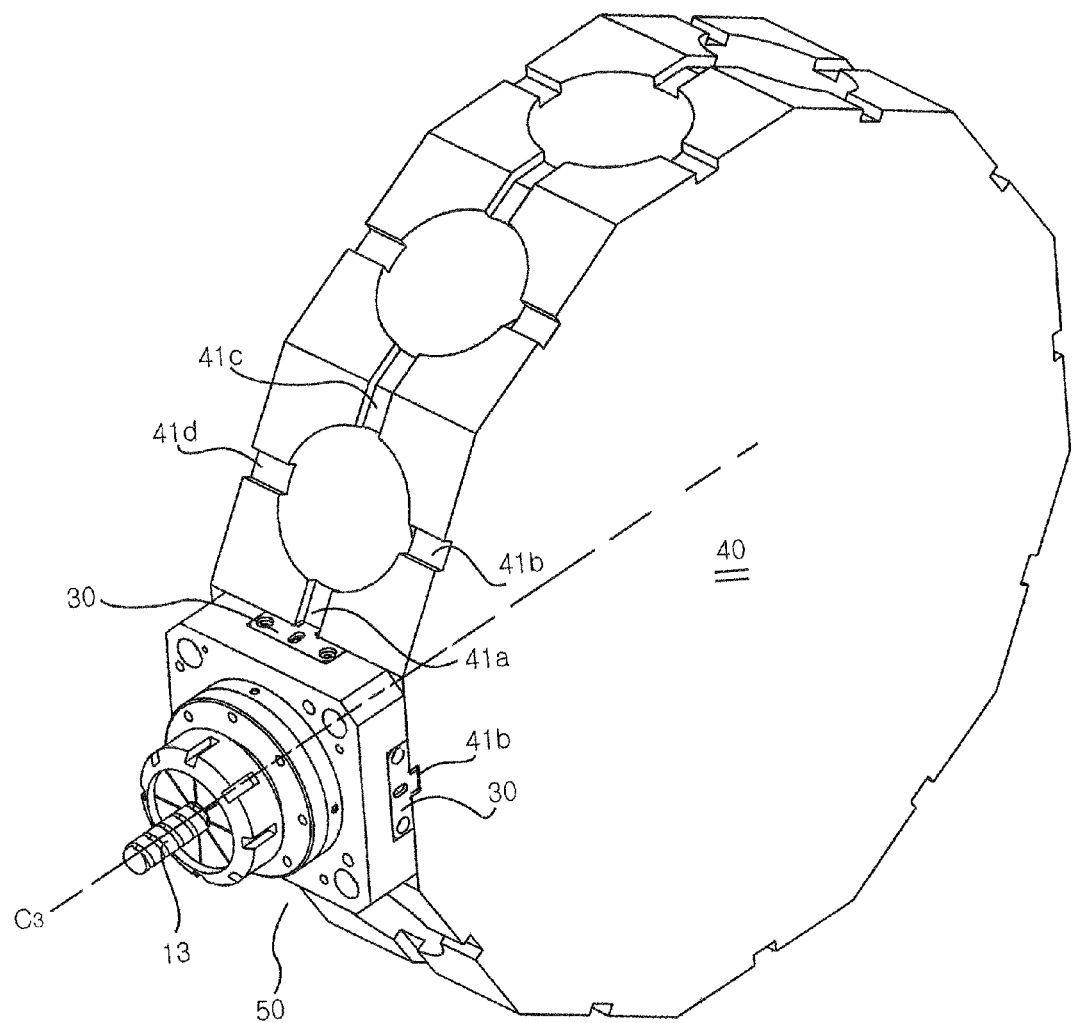
FIG. 8 is a view of a tool holder according to another preferred embodiment of the present invention.
Figure 9:
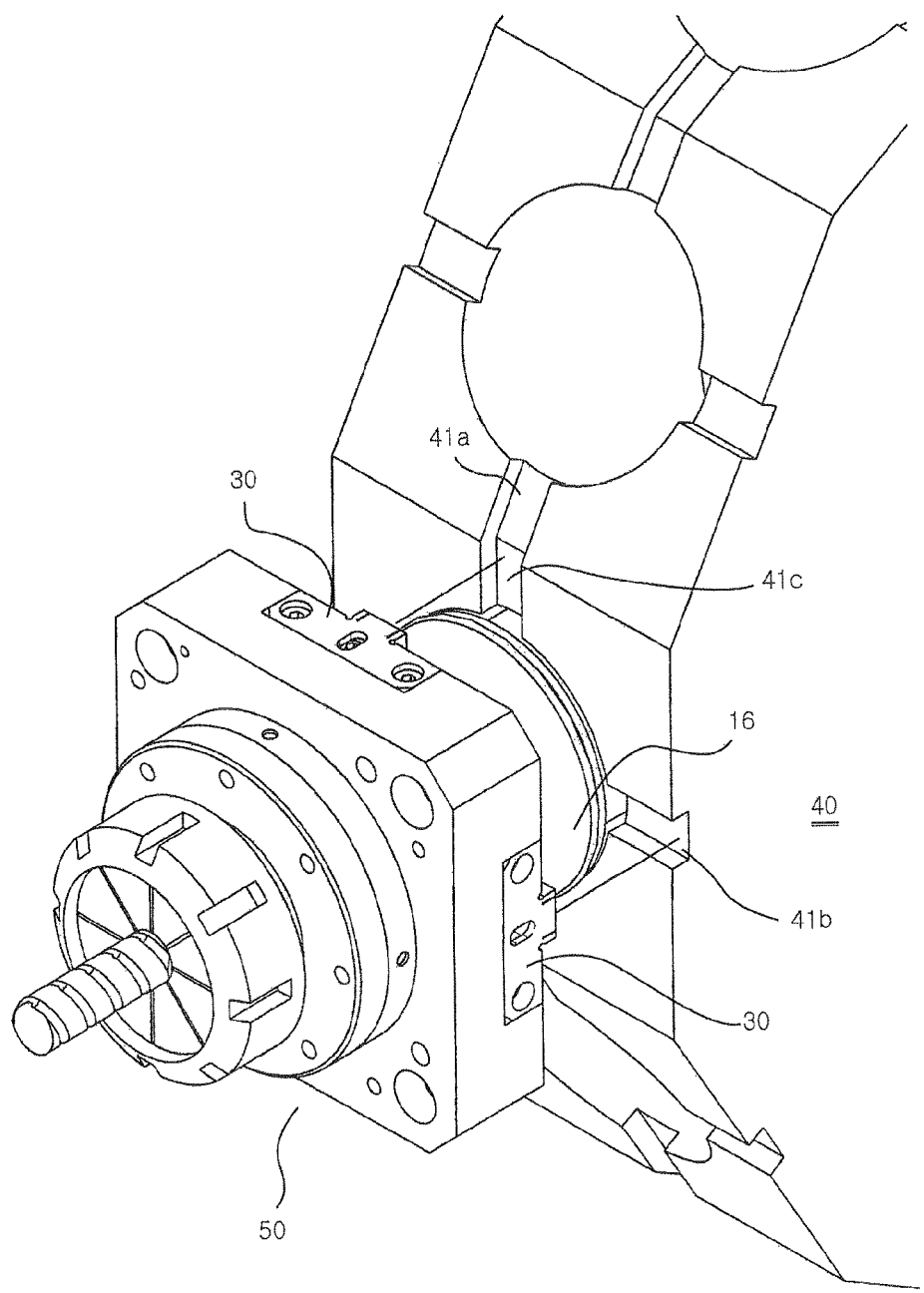
FIG. 9 is a view showing an assembly process of the tool holder according to the present invention.
Figure 10:
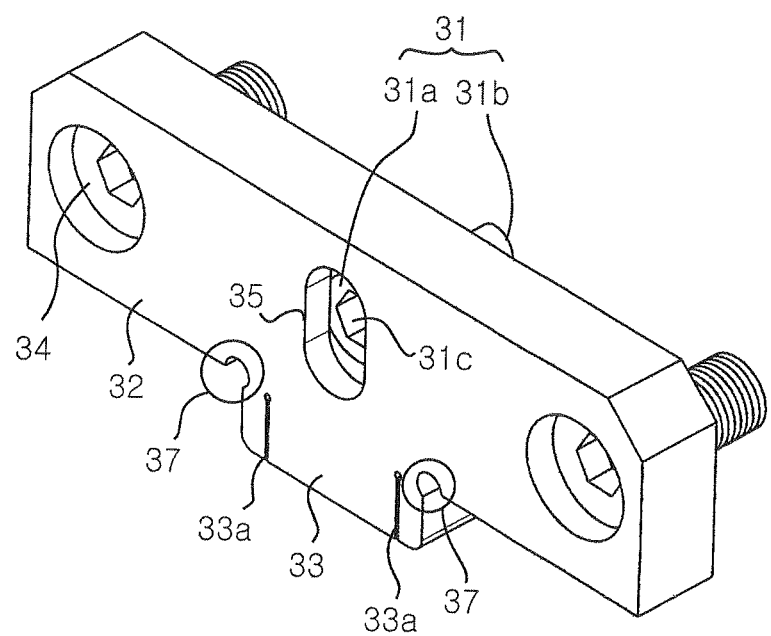
FIGS. 10 to 12 are views showing the structure of eccentricity controlling means according to the present invention.
Figure 11:
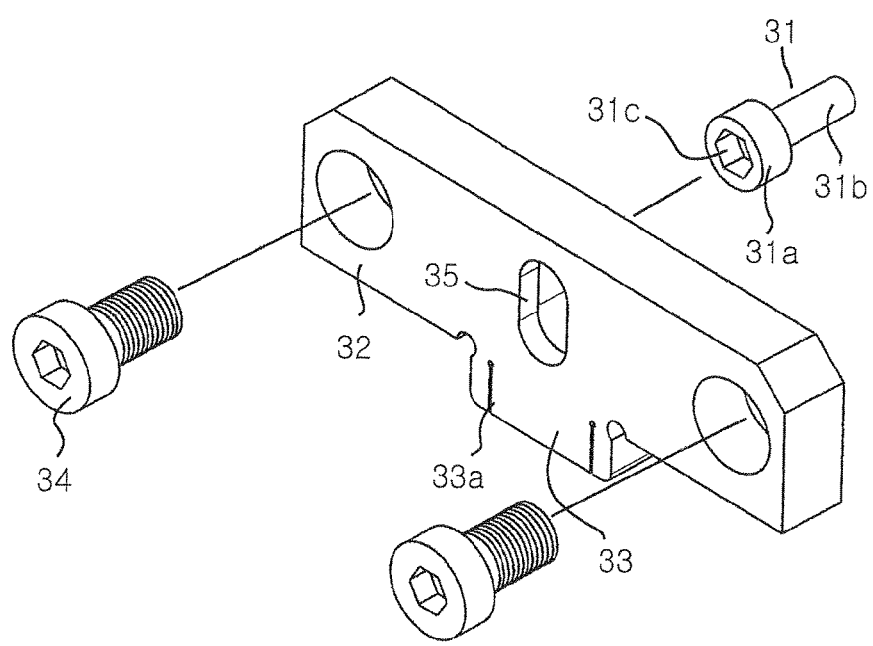
Figure 12:
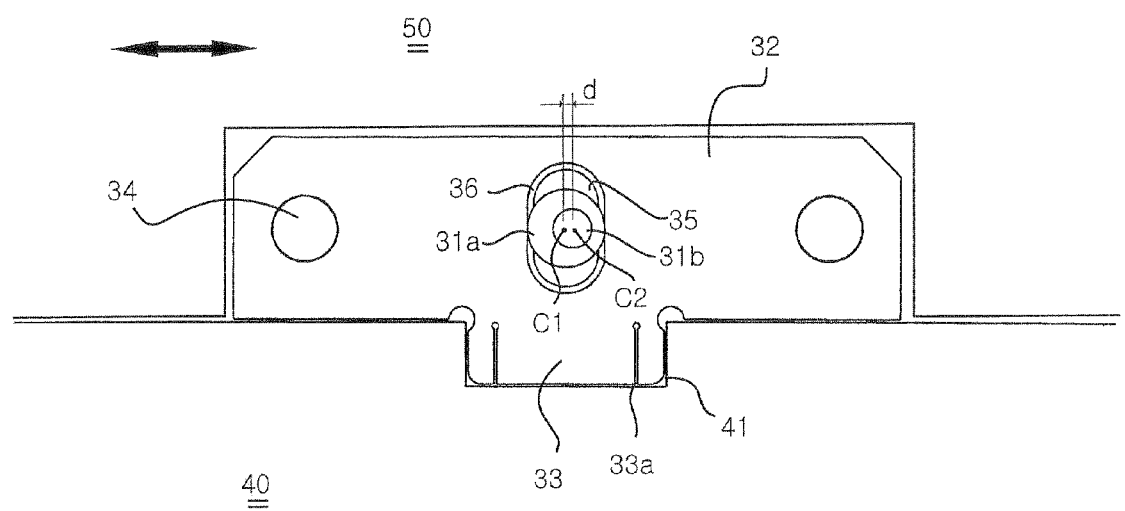

FIG. 8 is a view of a tool holder according to another preferred embodiment of the present invention, FIG. 9 is a view showing an assembly process of the tool holder according to the present invention, and FIGS. 10 to 12 are views showing the structure of eccentricity controlling means according to the present invention. The tool holder according to the present invention includes at least one eccentricity controlling means 30. The eccentricity controlling means 30 includes: an eccentricity control pin 31 having a head portion 31a and a body portion 31b which are eccentric by a predetermined amount and a wrench hole 31c formed in a cross section of the head portion; a block 32 having an elongated hole 35 to which the head portion 31a of the eccentricity control pin 31 is fit and a key 33 joined to a key groove 41 formed in a disk 40; and a joining bolt 34 for fixing the block 32 to the tool holder 50. A key 33 formed on the block 32 is partially cut to provide elasticity when both sides of the key 33 are joined to the key groove 41.

In FIGS. 8 and 9, the tool holder 50 joined to the disk 40 is joined by a bolt, but in the drawings, a bolt hole formed in the disk 40 is not illustrated.

First, as shown in FIG. 8, the eccentricity controlling means 30 is joined to one side of the body of the tool holder. It is preferable that two eccentricity controlling means 30 are respectively disposed at key grooves 41b and 41d in order to control vertical eccentricity, which may be generated between a central line $C_3$ of the disk and a horizontally central line of the tool holder 50. That is, the tool holder illustrated in FIG. 8 has a direction of the tool formed in the circumferential direction of the disk, and hence, in this case, it is very important to control eccentricity generated according to the vertical height between the central line $C_3$ of the disk and the tool holder.

Figure 13:
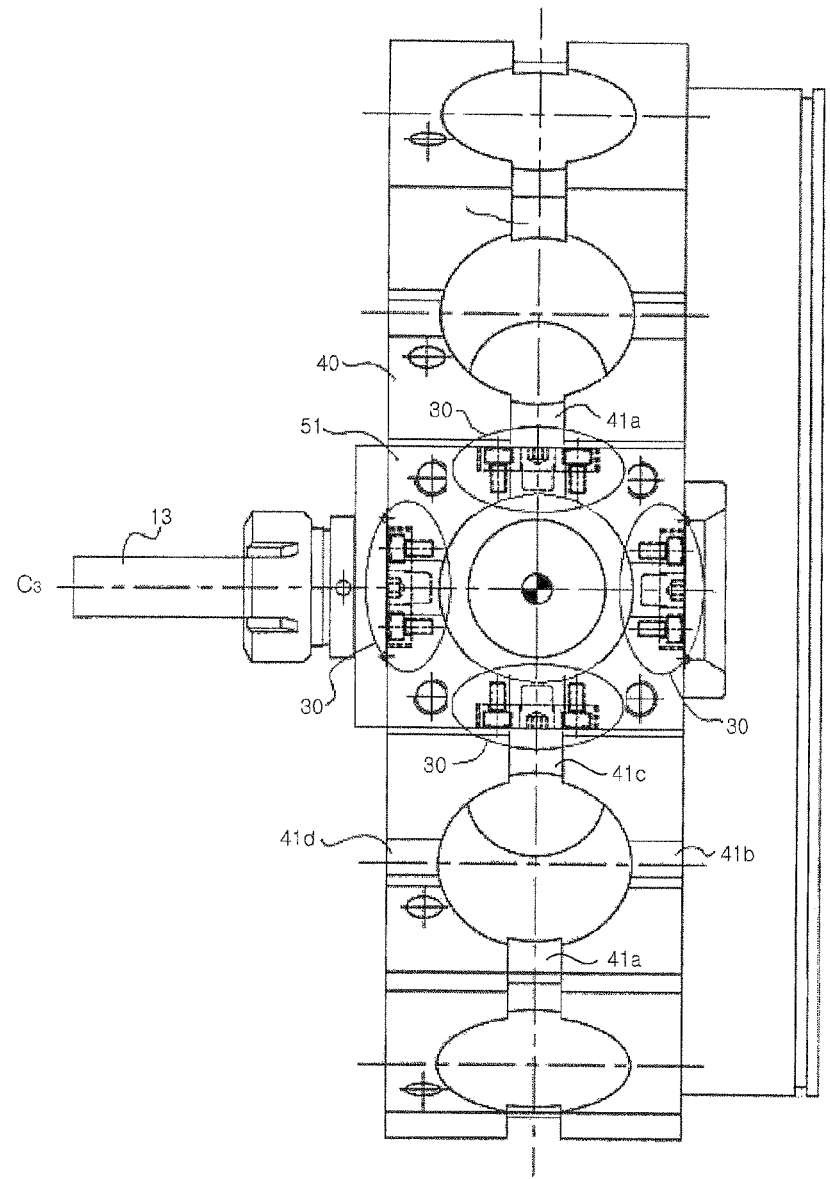
FIG. 13 is a view showing a tool holder according to a further preferred embodiment of the present invention.

Furthermore, FIG. 13 illustrates an angle-type tool holder 51. In FIG. 13, in the case that the direction of the tool is formed in a sectional direction of the disk, it can control not only the vertical eccentricity between the shank 16 of the body part of the tool holder and the disk but also the angle of deflection generated between the central line $C_3$ of the disk and the central line of the rotary tool 13, and it can be achieved by controlling the eccentricity controlling means 30 formed on the key grooves 41b and 41d.

Additionally, besides the above tool holders 50 and 51, tool holders of various forms may be attached to the disk 40, and in this instance, it is necessary to control lateral eccentricity of the tool holders 50 and 51. For this, the disk has key grooves 41a and 41c formed in the center thereof besides the key grooves 41b and 41d formed in the cross section of the disk, and at least one eccentricity controlling means 30 is formed on the key grooves 41a and 41c. Accordingly, it is preferable that the tool holder 50 or 51 has at least two eccentricity controlling means 30, but in order to secure only repetition of joining, just one eccentricity controlling means 30 may be formed on the tool holder.

Because the eccentricity control pin 31 of the eccentricity controlling means 30 has the head portion 31a and the body portion 31b which are eccentric to each other, when the eccentricity control pin 31 is rotated in the condition that the head portion 31a is fixed in movement, the position of the body portion 31b is changed, and so, the position of the tool holder 50 joined with the body portion 31b is also changed.

In other words, eccentricity is controlled in a state where the block 32 is finely movable relative to the tool holder 50 because the tool holder 50 and the block 32 are temporarily joined together. Referring to FIG. 12, the head portion 31a of the eccentricity control pin 31 is joined to the block 32, and the block 32 is fixed to the disk 40 by the key 33. Moreover, because the body portion 31b is fit to a hole (not shown) of the eccentricity control in formed in the tool holder 50 and is free to rotate but is fixed in lateral movement, when the head portion 31a is rotated, the head portion 31a is eccentrically rotated as much as the eccentric amount (distance) of the center $C_2$ of the body portion relative to the center $C_1$ of the head portion, and hence, the tool holder 50 joined to the body portion 31b moves laterally.

On the contrary, if the eccentricity control pin 31 is rotated in a state where the body portion 31b is free to rotate but is fixed in lateral movement, the head portion 31a will eccentrically rotate relative to the center of the body portion 31b and the block 32 joined with the head portion 31a and the disk 40 joined with the block 32 will be moved.

However, because the disk 40 cannot be moved, the position of the head portion 31a is fixed, and finally, the body portion 31b is moved due to reaction, and then, the tool holder joined with the body portion 31b is moved. In the state where the tool holder 50 is moved, when the block 32 joined to the tool holder 50 is completely joined to the tool holder 50 via the joining bolt 34, the work for controlling eccentricity or the angle of deflection is finished. Eccentricity is controlled in the same control direction as the eccentricity control pin 31, and the angle of deflection is controlled in the opposite direction to the control direction of the eccentricity control pin.

In the state where the eccentricity controlling work is finished, even though the tool holder 50 is rejoined after being separated from the disk 40, if the key 33 formed on the block 32 can be joined at its original position, the tool holder can be also joined at its original position. The process that the key 33 is fit to the key groove 41 while finding the original position where the initial work of controlling eccentricity was carried out is carried out by means of the cut portions 33a formed in the key, which will be described later.

The eccentricity control work is to adjust a difference, in fact, ranging from 0.01 mm to 0.05 mm. In machining centers or automatic lathes in which tool turrets are used, such a fine difference is very important, and such a difference may arise depending on the side of the key groove 41 with which the key 33 gets in contact.

Accordingly, in the present invention, the keys 33 are in contact with both sides of the key groove 41 due to the cut portions 33a formed in the key 33, so that the degree of repetition on joining and separation of the tool holder can be secured.

In amplification, additional feature of the present invention is that the key 33 formed on the block 32 has the cut portions 33a, and the key 33 of the block 32 due to the cut portions 33a has elasticity. That is, if the key 33 has the same size as the key groove 41 of the disk 40 or a larger size than the key groove 41, the key 33 may be joined to the disk 40 in a state where the gaps of the cut portions 33a of the key 33 are compressed while the key 33 is fit into the key groove 41, and the key 33 keeps the contact state with the cross sections of the key groove 41 due to the elasticity of the key 33.

In other words, as shown in FIG. 12, when the key is fit into the key groove 41 in the state where the gaps of the cut portions 33a of the key 33 are compressed, the outer face of the inner face of the key groove 41 come in closer contact with each other due to elasticity of the key to keep its original state, and then, the gap between the key 33 and the key groove 41 is disappeared through the close contact, so that the degree of joining the tool holder can be perfectly secured. Because such an action is repeated whenever the tool holder is joined and separated, the degree of joining can be always secured. Moreover, when the eccentricity or the angle of deflection is controlled, because the block 32 is firmly joined with the disk 40, the tool holder can be easily moved in the opposite direction by adjustment of the eccentricity control pin 31. In this instance, it is natural that power generated when eccentricity or the angle of deflection is controlled is within a range that elasticity displacement is not generated on the key 33 due to the cut portion 33a.

It is preferable that one to three cut portions 33a are formed in the key 33.

As shown in FIGS. 10 to 12, it is preferable that the block 32 has the elongated hole 35 to which the head portion 31a of the eccentricity control pin 31 is fit. The reason is to easily control eccentricity of the tool holder joined with the body portion by fixing the lateral movement of the head portion 31a and by making the vertical movement of the head portion 31a free in some degree to thereby rotate the head portion 31a smoothly.

Namely, the elongated hole is in contact with the circumferential surface of the head portion 31a of the eccentricity control pin in the lateral direction of FIG. 12 and is formed larger than the diameter of the head portion 31a of the eccentricity control pin in the vertical direction of FIG. 12, and hence, the lateral movement of the eccentricity control pin is limited but the vertical movement of the eccentricity control pin is free from intervention as much as the length of the elongated hole excepting the diameter of the head portion of the eccentricity control pin.

Furthermore, in order to prevent the eccentricity control pin 31 from being arbitrarily separated, the block 32 may have a retaining jaw 36. The retaining jaw 36 may have the same shape as the elongated hole or a unique shape that the head portion is not separated out. In order to rotate the head portion 31a toward the wrench hole 31c formed in the head portion 31a, a sufficient space for inserting a jig of a wrench thereinto must be secure.

The block 32 has right-angled bent portions formed between the key 33 and the body portion of the block, and the bent portions may respectively have recess portions 37, namely, a concave portion, in order to reduce an interference with a vertical side of the key groove.

In addition, in order to make joining of the key 33 and the key groove 41 easy, end portions of the key are rounded or truncated, for instance, through corner cutting.

Figure 14:
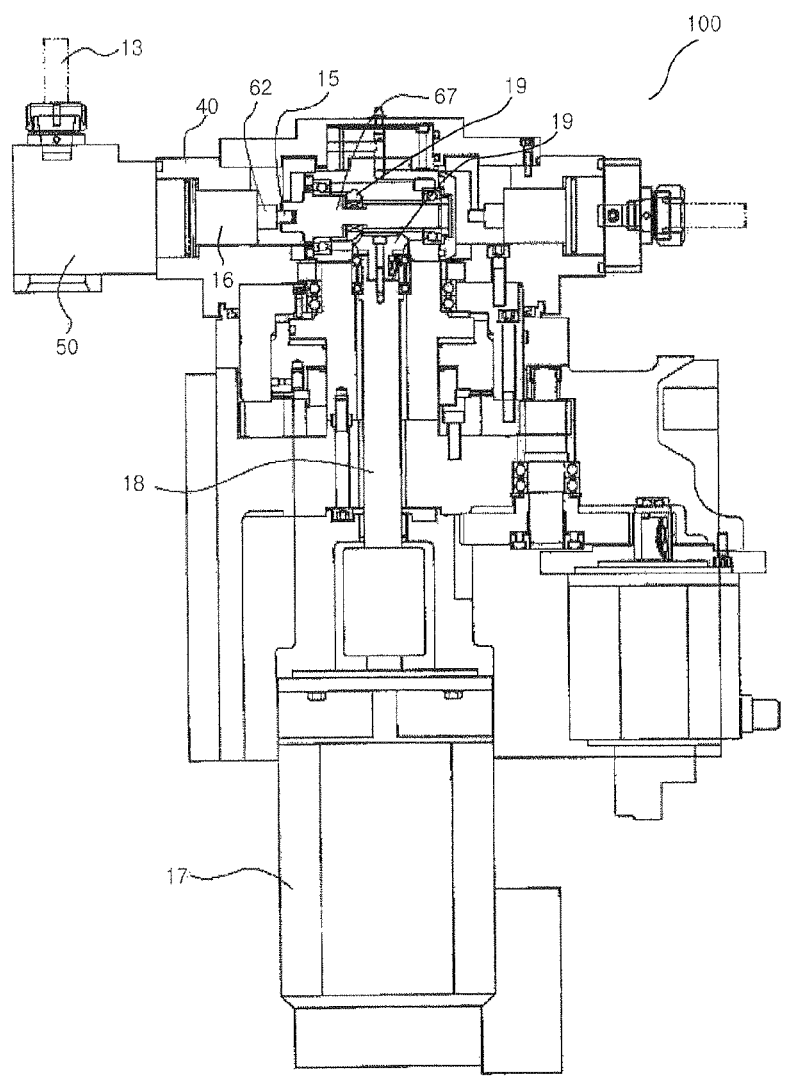
FIG. 14 is a view showing a structure of a tool turret which uses the tool holder according to the present invention.
Figure 15:
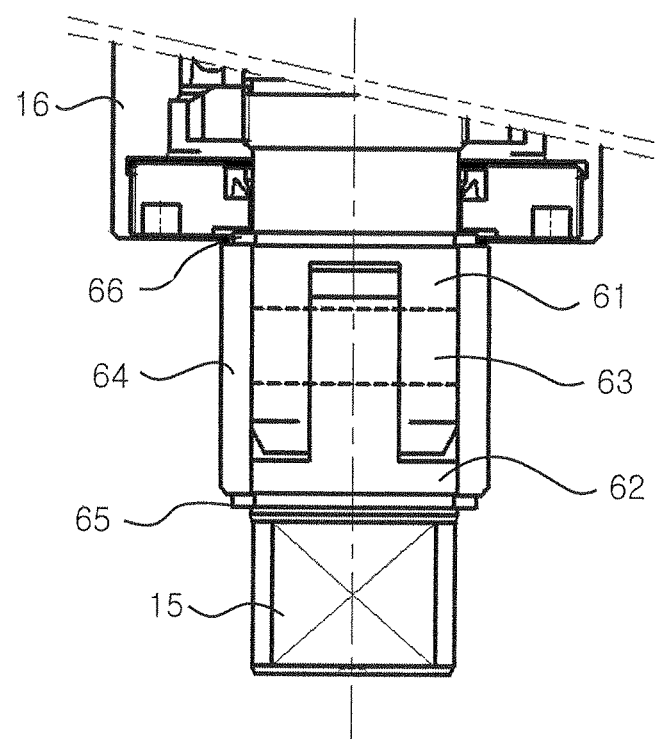
FIG. 15 is a partial view of the tool holder according to the present invention.
Figure 16:
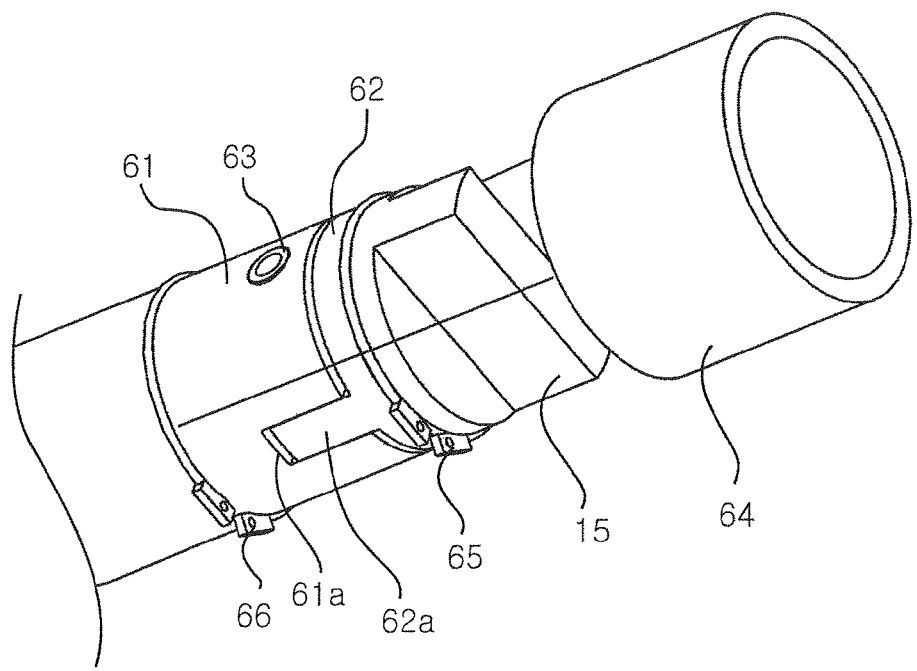
FIG. 16 is a perspective view, in partial section, of the tool holder.
Figure 17:
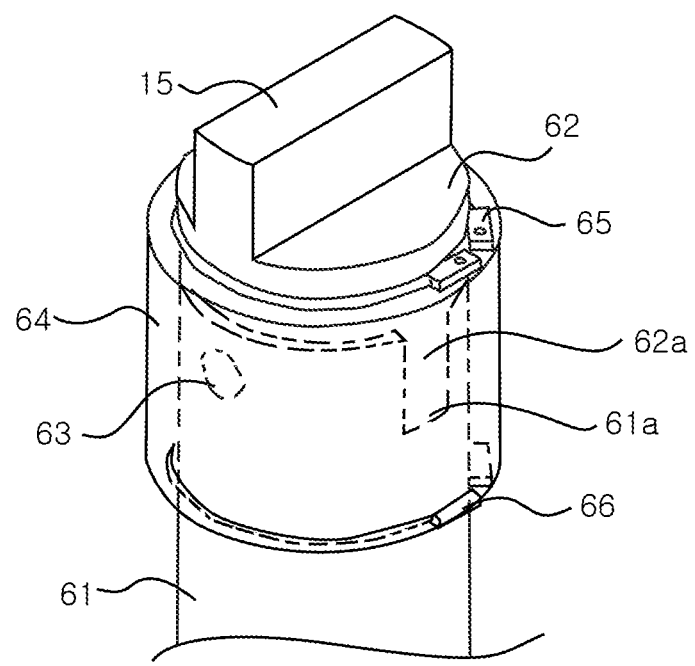
FIGS. 17 and 18 are views showing a used state of the tool holder according to the present invention.
Figure 18:
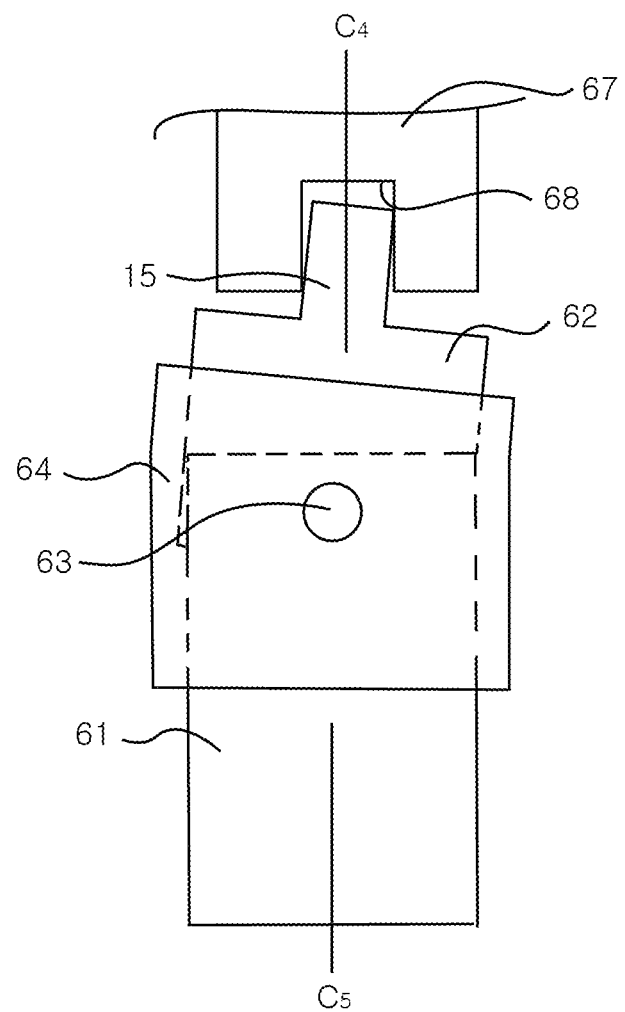
Figure 19:
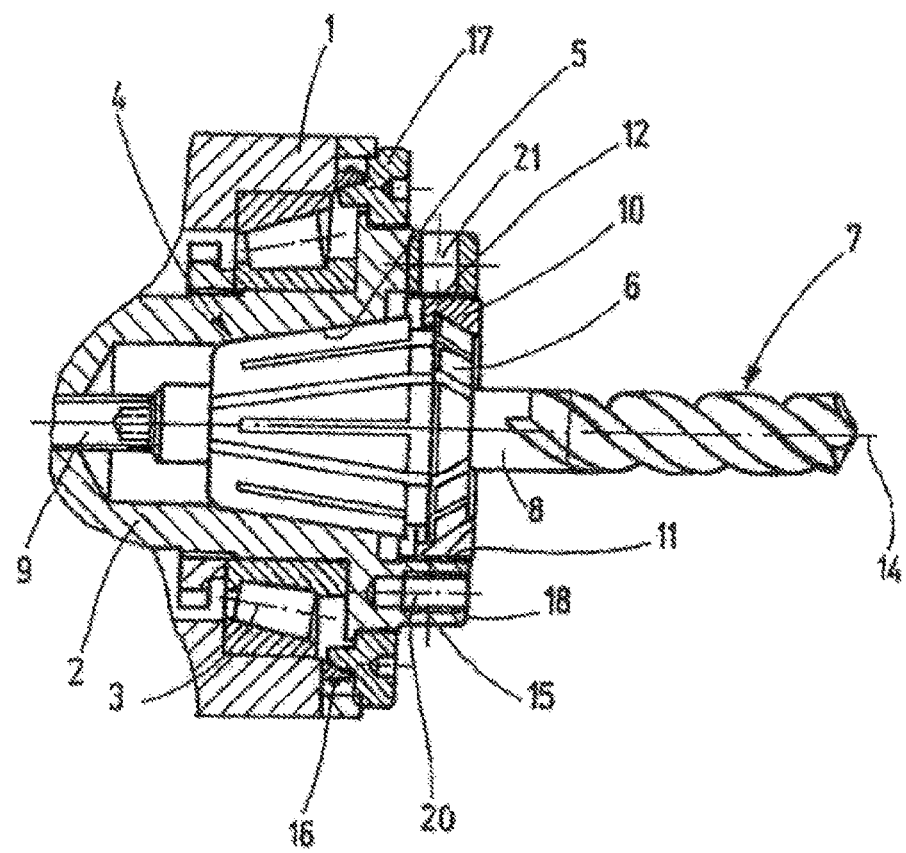
FIGS. 19 to 21 are views showing the structure of a tool holder according to a prior art.
Figure 20:
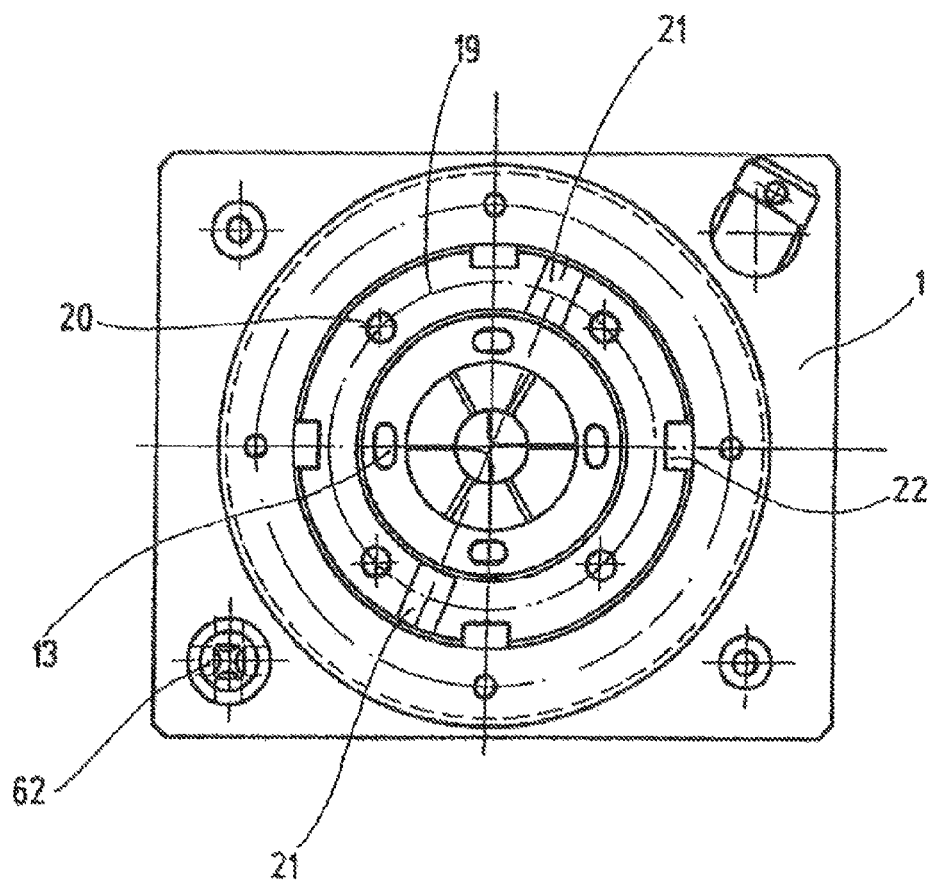
Figure 21:
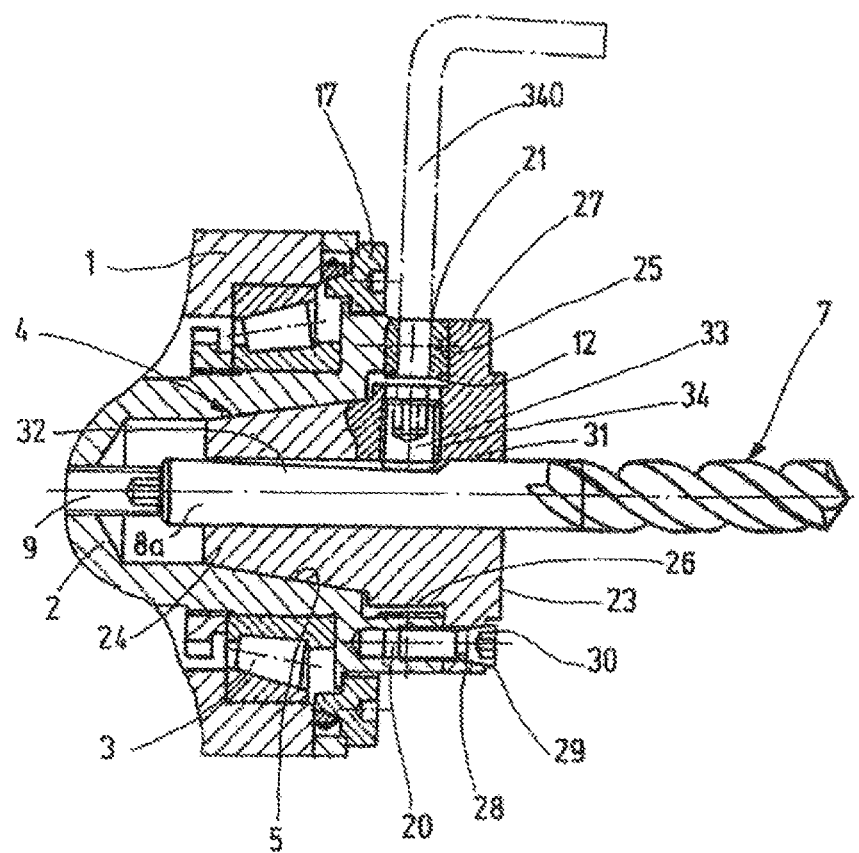

FIG. 14 is a view showing a structure of the tool turret which uses the tool holder according to the present invention, FIG. 15 is a partial view of the tool holder, FIG. 16 is a perspective view, in partial section, of the tool holder, and FIGS. 17 and 18 are views showing a used state of the tool holder. In the tool holder according to the present invention, a driving power of a motor is transferred to the rotary tool 50 through the key 15 and the spindle, and the spindle includes: a first tool spindle 61 formed inside the shank 16 which is inserted into the disk 40; and a second tool spindle 62 formed on one side of the first tool spindle 61 and having a key 15 formed at one side thereof, wherein the first tool spindle 61 and the second tool spindle 62 are joined together by a pin 63.

First, the driving power of the motor 17 is transferred to a bevel gear 19 through a shaft 18 formed inside the tool turret 100, and then, transferred to a drive shaft 67 through the bevel gear 19. The drive shaft 67 has a key groove 68. Moreover, the second tool spindle 62 having the key 15 fit into the key groove 68 is formed at one side of the drive shaft 67, and the first tool spindle 61 is formed at one side of the second tool spindle 62.

The first tool spindle 61 and the second tool spindle 62 respectively have through holes (which do not have reference numerals in the drawings), and pins 63 are fit into the holes. Due to the pin 63, the first tool spindle 61 and the second tool spindle 62 can keep their joined state and a rotational driving power transferred to the key 15 can be transferred to the first tool spindle 61.

Of course, it is natural that the rotational driving power is also transferred to the side where the first tool spindle 61 and the second tool spindle 62 are in contact with each other.

The pin 63 is forcedly fit and joined to the first tool spindle 61 so as to prevent separation of the pin 63, and if necessary, the pin 63 has a detention ring formed on one side thereof in order to prevent the pin 63 from being arbitrarily separated from the first tool spindle 61 after being joined to the first tool spindle 61. Alternatively, the pin 63 may be formed in a screw form and the hole formed in the first tool spindle 61 may have a spiral thread, so that the pin 63 and the first tool spindle are screw-coupled together.

In the case that the pin 63 is screwed, it is preferable that the hole formed in the first tool spindle 61 is formed in such a way as to be stopped at one side, and it is also preferable that a portion of the hole of the second tool spindle 62 and a portion of the pin 63 joined to the hole are not screwed.

Moreover, as shown in the drawings, the first tool spindle 61 has a depression portion 61a and the second tool spindle 62 has a protrusion 62a having a shape corresponding to the depression portion 61a, so that the second tool spindle 62 can be freely moved in the direction that the depression portion 61a is formed in a state where the second tool spindle 62 is joined to the first tool spindle 61 by means of the pin 63.

As shown in FIG. 16, it is preferable that the depression portion 61a is formed at right angles to the direction that the key 15 is formed. The reason is to secure the movement of the key 15 according to an interference of the key groove 68 because the second tool spindle 62 is free from interference in the direction that the key 15 is formed due to the shape of the key groove 68 formed in the drive shaft 67 but is limited in movement by the key groove 68 in the perpendicular direction to the direction that the key 15 is formed.

It is preferable that the pin 63 is forcedly fit to the first tool spindle 61 so that the pin 63 is not separated from the first tool spindle 61 unless any external force is applied after being forcedly fit to the first tool spindle 61, but is joined to the second tool spindle 62 with some room.

In other words, the pin 63 joined to the first tool spindle 61 keeps its position through the forced fitting, but the pin 63 is joined to the second tool spindle 62 in such a fashion that the second tool spindle 62 is freely movable around the pin 63 because the second tool spindle 62 has the hole with a diameter larger than the outer diameter of the pin 63.

In the above embodiment, because the second tool spindle 62 can be freely rotated around the pin 63 due to its self-weight without any external force, a support ring 64 may be additionally formed on the outside of the joined portion where the first tool spindle 61 and the second tool spindle 62 are joined together.

It is preferable that the support ring 64 is made of an elastic material, which can be transformed when an external force exceeding a predetermined level is applied and can keep the initial form, namely, straightness of the second tool spindle 62 to the first tool spindle 61, due to its elasticity when the external force is removed.

Additionally, the support ring 64 must keep straightness of the second tool spindle 62 to the first tool spindle 61 under the condition that the external force is not applied, and such a support ring 64 may be made of synthetic rubber, urethane, and so on.

In this instance, in order to prevent the support ring 64 from being separated out after the support ring 64 is joined to the first tool spindle 61 and the second tool spindle 62, a retaining ring 65 may be formed at one side of the second tool spindle 62.

Moreover, in order to prevent the retaining ring 65 and the support ring 64 from getting in contact with the cross section of the shank 16, another retaining ring 66 may be formed at one side of the first tool spindle 61.

According to circumstances, instead of the retaining rings 65 and 66, protrusions (not shown) may be formed at the sides of the first tool spindle 61 and the second tool spindle 62 in such a fashion that the support ring 64 is fit between the protrusions to thereby keep its position.

Now, the operation of the tool holder according to the present invention will be described. When the tool holder 50 is inserted into the disk 40, the key formed on the second tool spindle 62 is fit into the key groove 68 of the drive shaft 67, and then, the rotational driving power of the drive shaft is transferred to the first tool spindle 61 and the rotary tool 50 through the key groove 68, the key 15, and the second tool spindle 62.

Of course, in the above instance, it is preferable that the second tool spindle 62 keeps straightness to the first tool spindle 61 by the support ring 64.

In this instance, if the position of the key 15 is change due to a joining error of the tool holder or the position of the key groove 68 is changed due to a thermal strain of a main shaft 69, eccentricity or angle deflection may arise on the central axis $C_4$ of the key groove 68 and the central axis $C_5$ of the key 15.

In the above case, driving power is transferred under the condition that one side of the key 15 gets in contact with one side of the key groove 68, and the central axis of the second tool spindle 62 is more inclined than the central axis of the first tool spindle 61. Even in the above condition, the first tool spindle 61 and the second tool spindle 62 can transfer driving power with unstudied ease, so that it can prevent a noise caused from a contact between the key groove 68 and the key 15 and relieve the phenomenon that power is leaned to the bearing supporting the spindle to thereby enhance durability of the tool holder.

In this embodiment, the joined portion of the first tool spindle 61 is formed on the outside of the shank 16 and the whole second tool spindle 62 is formed on the outside of the shank 16, but according to circumstances, the whole first tool spindle 61 may be formed inside the shank 16 and the joined portion where the first tool spindle 61 is joined with the second tool spindle 62 may be formed inside the shank 16.

In this instance, the degree of freedom of the second tool spindle 62 may be less than that of the above embodiment, and may do not need the support ring 64.

Furthermore, the second tool spindle 62 has the protrusion 62a and the first tool spindle 61 has the depression portion 61a, but on the contrary, it is possible that the second tool spindle 62 has a depression portion and the first tool spindle 61 has a protrusion.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A tool holder, which receives a rotational force through a spindle (2) driven by an external motor and transfers the rotational force to a rotary tool, the tool holder comprising:
    a body (1);
    the spindle (2) disposed within the body (1), the spindle (2) having blocks (5) being respectively rotatable on hinge pins (7), and bolts (6) being respectively fastened to bolt holes (5a) of the blocks (5); and
    an adapter (3) inserted into the spindle (2), the adapter (3) having at least one joining hole (4) formed in one side thereof,
    wherein the adapter (3) is closely fixed to the spindle (2) when the bolts (6) are fastened to the blocks (5),
    wherein each of the bolts (6) has a tapered side formed on a head portion and the joining hole (4) of the adapter (3) has a tapered groove (4a), so that the tapered side of a specific bolt (6) and the tapered groove (4a) of the joining hole (4) for the specific bolt (6) come into contact with each other to adjust the position of the adapter (3) while each of the bolts (6) is joined to a corresponding block (5).

2. The tool holder according to claim 1, wherein the adapter (3) has a key formed at one side thereof and the spindle (2) has a key coupling hole having a shape corresponding to the shape of the key, so that the adapter (3) can be always joined at an exact position even though it is rejoined after being separated from the spindle (2).

3. The tool holder according to claim 2, wherein at least one of the bolts (6) or the blocks (5) formed on an extension line of the longitudinally central axis of the key (9) has a color or a distinguishable mark different from the other bolts (6) or blocks (5), so that a user can easily distinguish it.

4. The tool holder according to claim 1, wherein each of the blocks (5) comprises a stopper device (20) to limit a movement of the corresponding block (5) unless an external force is applied when the corresponding block (5) reaches a specific position.

5. The tool holder according to claim 4, wherein the stopper device (20) of a specific one of the blocks (5) comprises:
    a positioning recess (7a) formed in a hinge pin (7) joined to the corresponding block (5);
    a ball plunger (22) mounted on the spindle (2);
    a ball (23) partially inserted into the ball plunger (22); and
    a fixing bolt (21) for fixing the ball plunger (22) to the spindle (2).

6. The tool holder according to claim 1, wherein the rotational force is transferred to the rotary tool (13) through the spindle for transferring the rotational force in direct contact with a collet to which the rotary tool (13) is joined, and the spindle comprises:
    a first tool spindle (61) formed inside a shank (16) which is inserted into a disk (40); and
    a second tool spindle (62) formed on one side of the first tool spindle (61) and having a key (15) formed at one side thereof, wherein the first tool spindle (61) and the second tool spindle (62) are joined together by a pin (63).

7. The tool holder according to claim 6, wherein the first tool spindle (61) has a depression portion (61a) and the second tool spindle (62) has a protrusion (62a) having a shape corresponding to the depression portion (61a).

8. The tool holder according to claim 6, wherein a support ring (64) is provided on the outside of the joined portion where the first tool spindle (61) and the second tool spindle (62) are joined together, so as to keep an axis of the second tool spindle (62) coincidental with an axis of the first tool spindle (61) when there is no external force.

9. The tool holder according to claim 6, wherein a retaining ring (65) is formed at one side of the second tool spindle (62) in order to prevent a support ring (64) from being separated.

10. The tool holder according to claim 7, wherein the depression portion (61a) of the first tool spindle (61) is formed in a perpendicular direction to a direction of a longitudinally central axis of the second tool spindle (62).

11. The tool holder according to claim 6, wherein the pin (63) is forcedly fit to the first tool spindle (61) or keeps a position of the pin (63) by a retaining ring at one side thereof.

* * * * *